United States Patent [19]
Kim

[11] Patent Number: 5,984,221
[45] Date of Patent: Nov. 16, 1999

[54] ADJUSTABLE BRAKE FOR BAITCAST REEL

[75] Inventor: Hyunkyu Kim, Broken Arrow, Okla.

[73] Assignee: Zebco Division of Brunswick Corporation, Tulsa, Okla.

[21] Appl. No.: 09/176,734

[22] Filed: Oct. 21, 1998

[51] Int. Cl.⁶ .................................................. A01K 89/02
[52] U.S. Cl. ........................... 242/289; 242/286; 188/185
[58] Field of Search .................................... 242/286, 287, 242/289, 294; 188/187, 185

[56] References Cited

U.S. PATENT DOCUMENTS

| | | |
|---|---|---|
| 5,108,042 | 4/1992 | Puryear et al. . |
| 5,118,049 | 6/1992 | Roberts et al. . |
| 5,217,182 | 6/1993 | Puryear et al. . |
| 5,257,753 | 11/1993 | Sato . |
| 5,301,899 | 4/1994 | Sato . |
| 5,305,967 | 4/1994 | Sato . |
| 5,308,021 | 5/1994 | Ikuta . |
| 5,344,098 | 9/1994 | Roberts . |
| 5,362,011 | 11/1994 | Sato ........................................ 242/289 |
| 5,372,324 | 12/1994 | Sato .................................... 242/289 X |
| 5,692,693 | 12/1997 | Yamaguchi .......................... 242/289 X |
| 5,803,385 | 9/1998 | Baisch ................................. 188/185 X |

*Primary Examiner*—Donald P. Walsh
*Assistant Examiner*—Emmanuel M. Marcelo
*Attorney, Agent, or Firm*—Fellers, Snider, Blankenship, Bailey & Tippens

[57] ABSTRACT

A braking apparatus for a fishing reel comprising: a carrying structure for carrying a braking surface; at least one turnable cam including at least one ramp segment having an outer end and a base end; at least one interacting member, projecting from the carrying structure, for interacting with the cam; a first retaining feature at the base end; and a second retaining feature following the outer end. The cam can be turned to selectively move the interacting member to the first and second retaining features. When the interacting member is retained by the first retaining feature, the braking surface will be located at a first position. When the interacting member is retained by the second retaining feature, the braking surface will be located at a second position different from the first position. The inventive apparatus further comprises at least one biasing member for providing a biasing force such that, when the interacting member is positioned between the base end and the outer end of the ramp segment, the biasing force will act to cause the interacting member to be received by the first retaining feature.

10 Claims, 11 Drawing Sheets

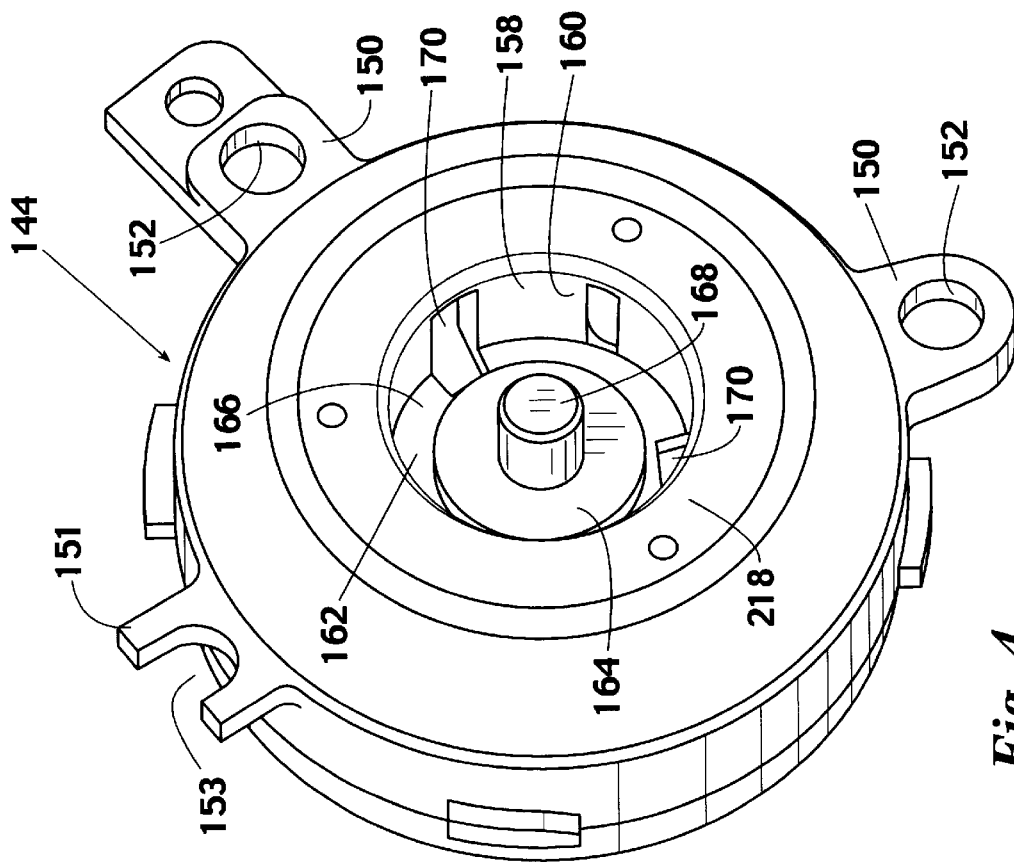
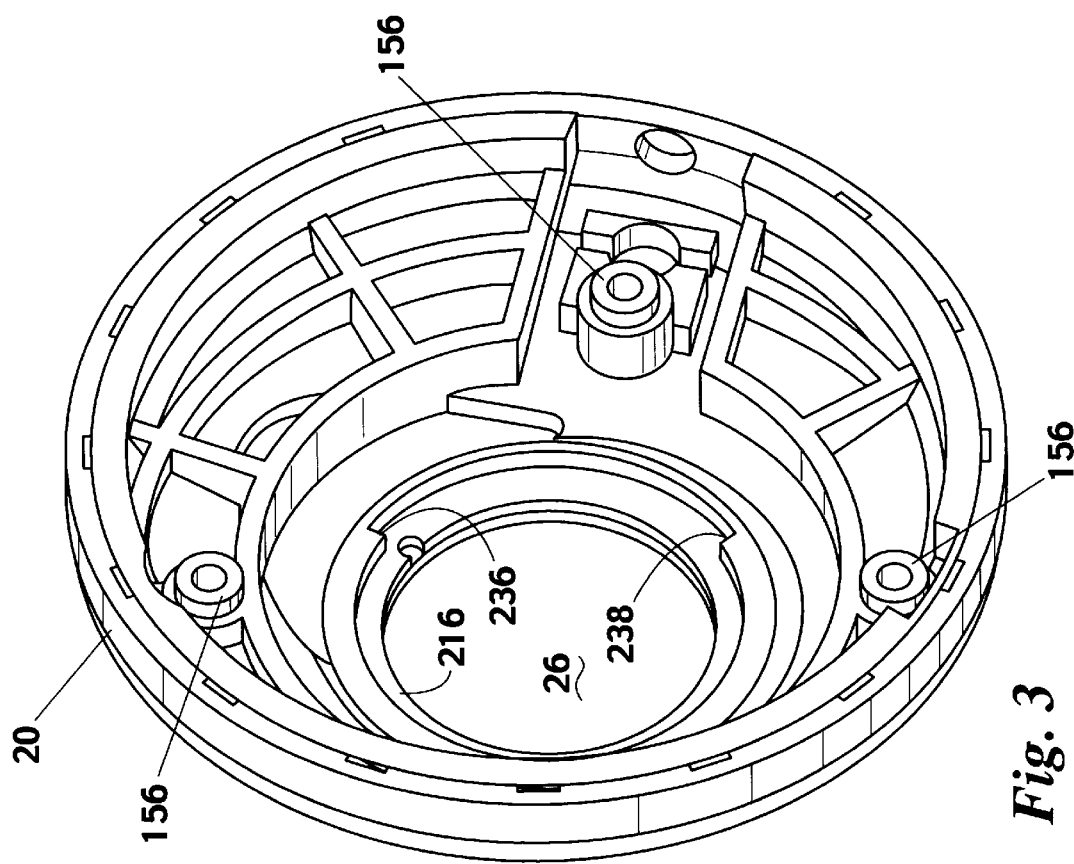
Fig. 4
Fig. 3

ADJUSTABLE BRAKE FOR BAITCAST REEL

FIELD OF THE INVENTION

The present invention relates to adjustable braking systems for baitcast fishing reels.

BACKGROUND OF THE INVENTION

Spool drag or spool braking systems are commonly used in baitcasting reels to alleviate line backlashing (also referred to as "line nesting") problems. Because they utilize transversely-oriented spools which rotate during casting, baitcasting reels are more prone to backlashing problems than are spinning reels and spin-casting reels. Such problems result primarily from the rotational momentum carried by the spool.

U.S. Pat. No. 5,305,967 discloses a centrifugal braking system commonly used in baitcasting reels. The centrifugal braking system includes: a plurality of rod-like members projecting radially from the end of the spool shaft; a plurality of tubular braking pieces or weights slidably mounted on the rod-like members; and a fixed brake ring encompassing the distal ends of the rod-like members. When the spool shaft rotates, the braking pieces move outwardly on the rod-like members into frictional contact with the brake ring. This frictional contact provides a braking force which slows the rotation of the spool.

The centrifugal braking system desirably exerts a braking force which varies in proportion to the rotational speed of the spool. Unfortunately, however, to make even minor adjustments to the centrifugal system (e.g., to account for the use of a heavier or lighter lure), the side of the reel must be disassembled and the individual braking pieces must be individually manipulated. Typically, the individual pieces can be snapped into fixed position adjacent the spool shaft whereby the pieces are prevented from sliding into frictional contact with the brake disc. Alternatively, the individual braking pieces can be either replaced or removed.

In addition to such adjustment problems, centrifugal braking assemblies of the type used in U.S. Pat. No. 5,305,967 (a) require a relatively large amount of space, (b) are easily damaged (e.g., by bending the rods while making system adjustments), and (c) can easily become unbalanced.

U.S. Pat. No. 5,308,021 discloses a centrifugal braking system wherein the braking force exerted by the system can be selectively adjusted by operating a dial mechanism positioned under the cover of the reel. Rather than using a fixed braking ring, the U.S. Pat. No. 5,308,021 system employs an axially movable braking structure. Additionally, rather than having a strictly cylindrical braking surface, the U.S. Pat. No. 5,308,021braking structure presents a frusto-conical braking surface which diverges toward a small diameter, cylindrical braking surface. Further, the roughness of the braking surface varies such that the frictional coefficient presented by the surface increases as the surface is adjusted axially toward the braking elements.

Unfortunately, the U.S. Pat. No. 5,308,021 system uses only a tubular-type braking element assembly and is therefore subject to the same space, damage, and balance problems discussed above. Additionally, unless the U.S. Pat. No. 5,308,021 reel is disassembled and the individual braking elements are either removed or locked into position adjacent to the spool shaft, the U.S. Pat. No. 5,308,021 system cannot be adjusted such that the individual braking pieces are completely prevented from contacting any portion of the braking surface. The production of a braking surface of the type employed in U.S. Pat. No. 5,308,021 having a varying degree of roughness would also be both difficult and costly. Further, tubular braking elements of the type used in the U.S. Pat. No. 5,308,021 system will spin and wear when contacting either an inclined braking surface or a braking surface having a progressively increasing coefficient of friction. Such spinning and wear will likely cause the tubular braking elements to rattle. A substantial amount of rattle will likely also occur when the braking elements frictionally contact the rougher portions of the braking surface.

SUMMARY OF THE INVENTION

The present invention provides an adjustable braking apparatus which satisfies the needs and alleviates the problems mentioned above. As with other centrifugal braking systems, the inventive braking system provides a proportional braking force which desirably varies in relation to the rotational speed of the reel spool. However, the inventive system requires less space than previous systems and provides easy adjustment without disassembly and without having to remove the reel side cover. Additionally, the inventive system ensures that specific, predetermined braking positions are always maintained so that (a) the user will always know what the position of the system is and the degree of braking force being applied and (b) the braking elements, when in braking position, will always contact the braking surface in a correct manner.

In one aspect, the inventive braking apparatus comprises: a carrying structure for carrying a braking surface; at least one turnable cam including at least one ramp segment having an outer end and a base end; at least one interacting member, projecting from the carrying structure, for interacting with the cam; a first retaining feature at the base; and a second retaining feature following the outer end. The cam can be turned to selectively move the interacting member to the first and second retaining features. When the interacting member is retained by the first retaining feature, the braking surface will be located at a first position. When the interacting member is retained by the second retaining feature, the braking surface will be located at a second position different from the first position. The inventive apparatus further comprises at least one biasing member for providing a biasing force such that, when the interacting member is positioned between the base end and the outer end of the ramp segment, the biasing force will act to cause the interacting member to be received by the first retaining feature.

In another aspect, the present invention provides a braking apparatus for a fishing reel comprising: a contacting structure; a plurality of braking elements for contacting the contacting structure to generate a braking force; placing means for selectively placing the contacting structure in a plurality of specific, predetermined positions relative to the braking elements; and biasing means for automatically moving the contacting structure, whenever the contacting structure is positioned between any adjacent two of the specific predetermined positions, to one of the adjacent two specific predetermined positions.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 3 provides a perspective interior view of the left side cover 20 of reel 2.

FIG. 4 provides a perspective exterior view of a spool cover 144 employed in reel 2.

DESCRIPTION OF THE PREFERRED EMBODIMENTS

Figure 1:
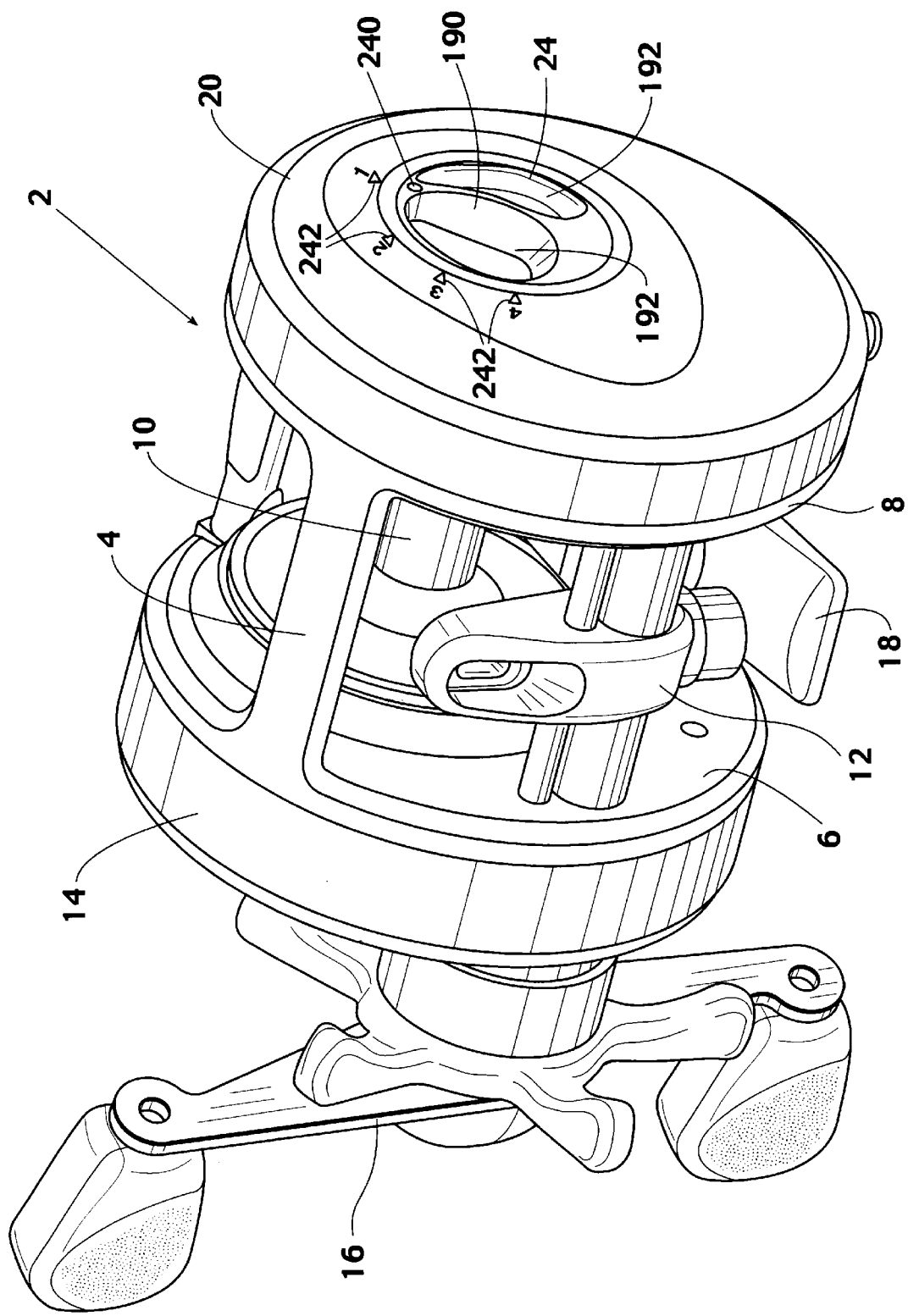
FIG. 1 provides a perspective view of a baitcasting reel 2 incorporating an embodiment 1 of the inventive centrifugal braking apparatus.
Figure 2A:
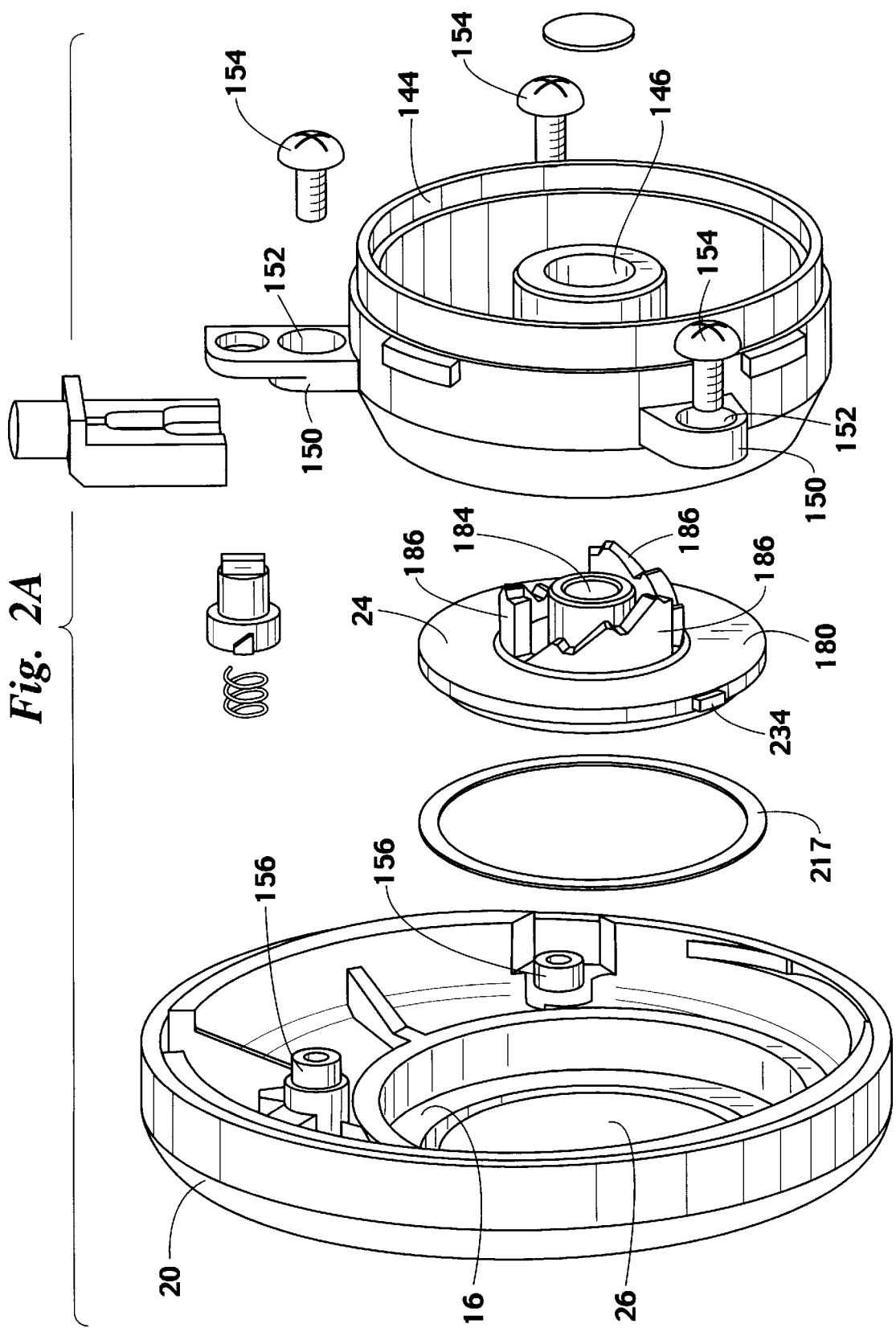
FIGS. 2A and 2B provide an exploded perspective view of inventive braking apparatus 1.
Figure 2B:
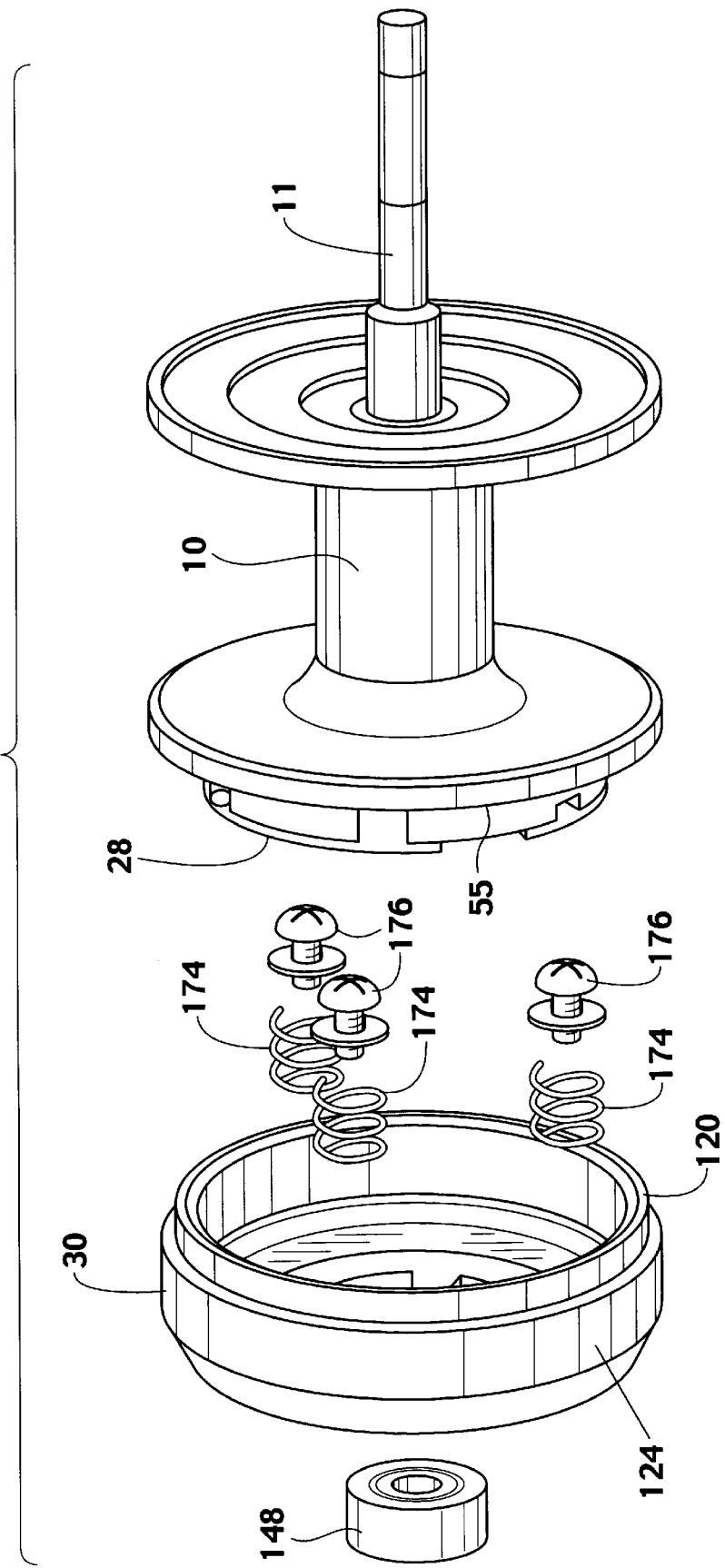
Figure 5:
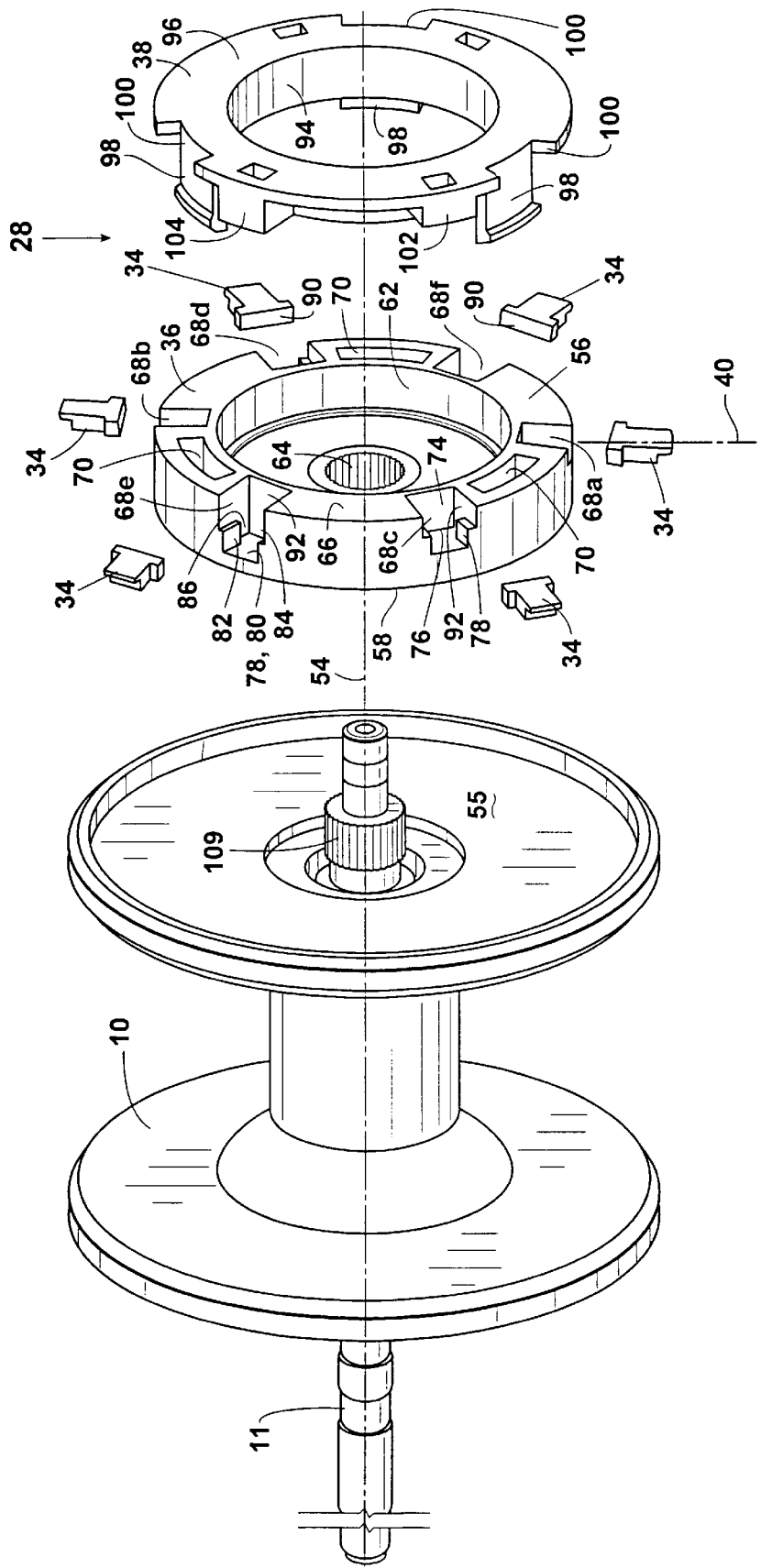
FIG. 5 provides an exploded perspective view of an inventive brake element assembly 28 employed in inventive braking apparatus 1.
Figure 6:
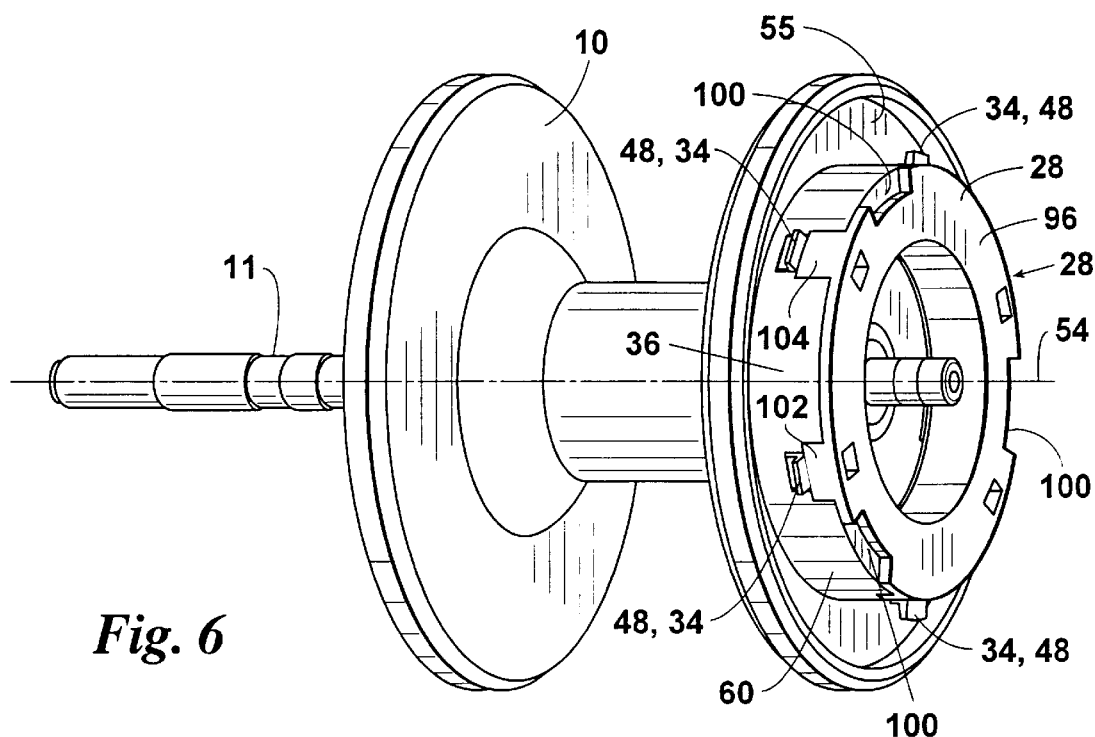
FIG. 6 provides an assembled perspective view of brake element assembly 28.
Figure 7:
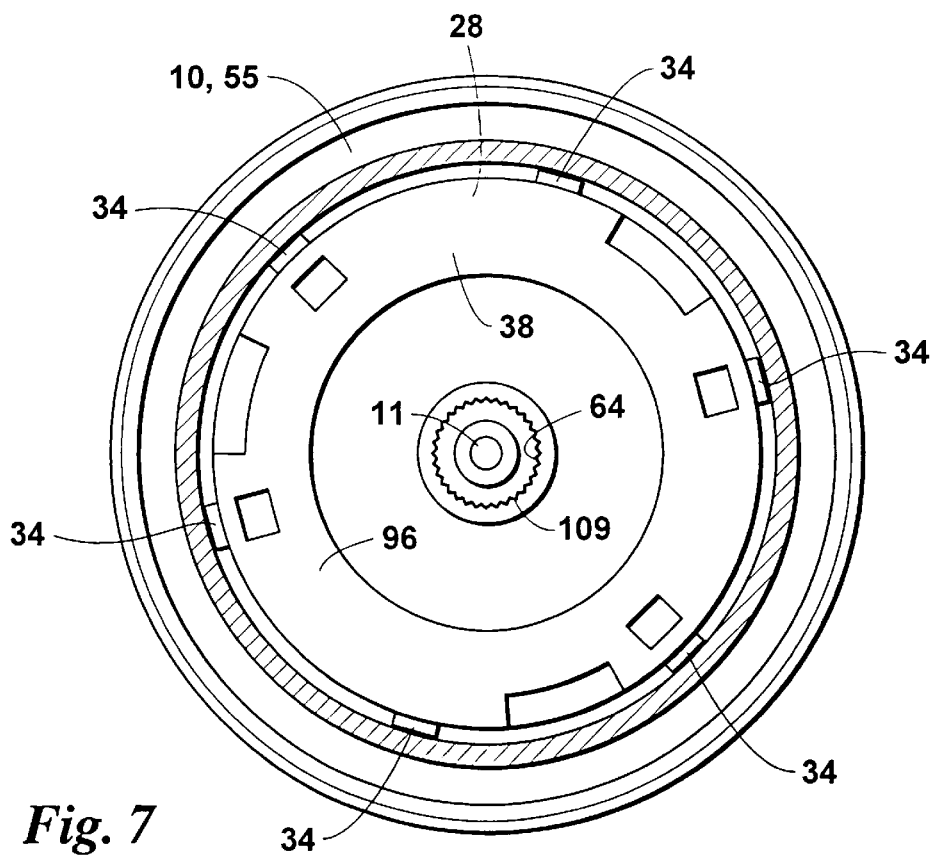
FIG. 7 provides an elevational front view of brake element assembly 28.
Figure 8:
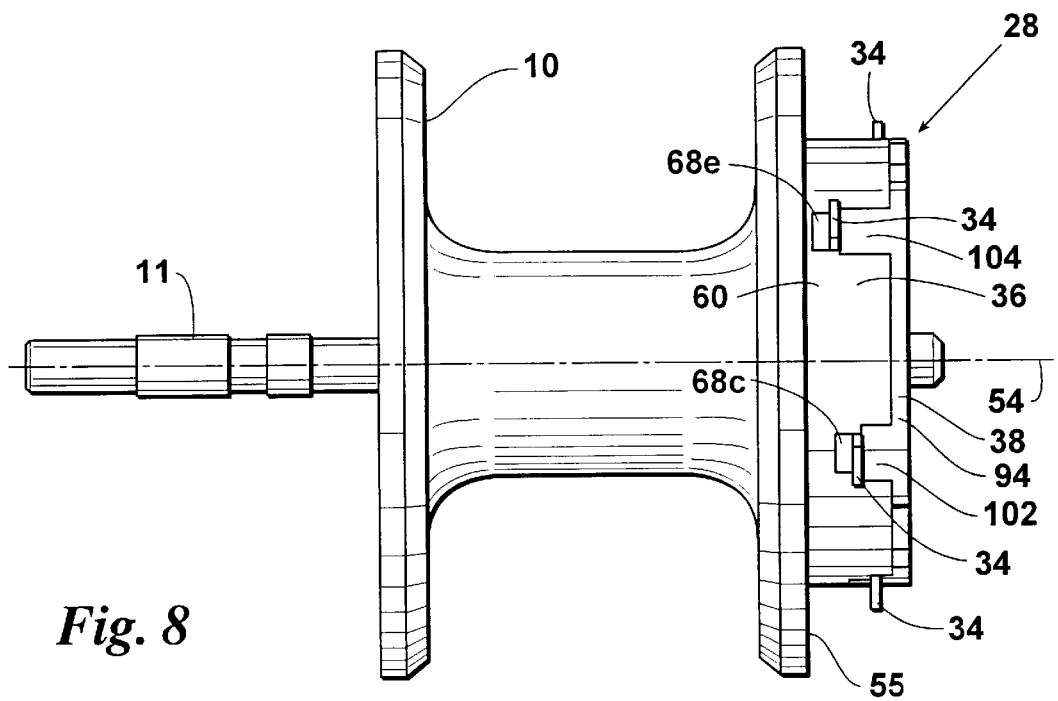
FIG. 8 provides an elevational side view of brake element assembly 28.
Figure 12:
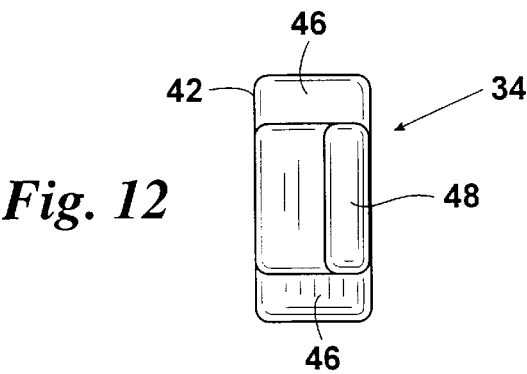
FIG. 12 provides a distal en d view of brake element 34.
Figure 9:
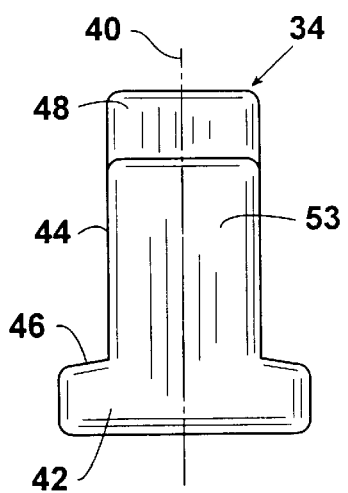
FIG. 9 provides an elevational rear view of a brake element 34 employed in brake element assembly 28.
Figure 10:
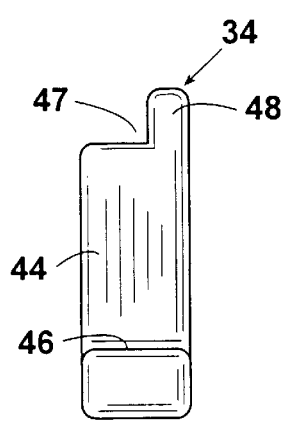
FIG. 10 provides an elevational side view of brake element 34.
Figure 11:
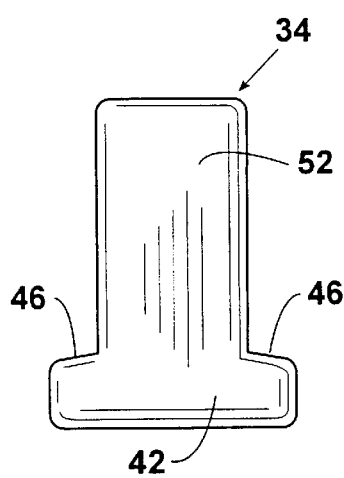
FIG. 11 provides an elevational forward view of brake element 34.
Figure 13:
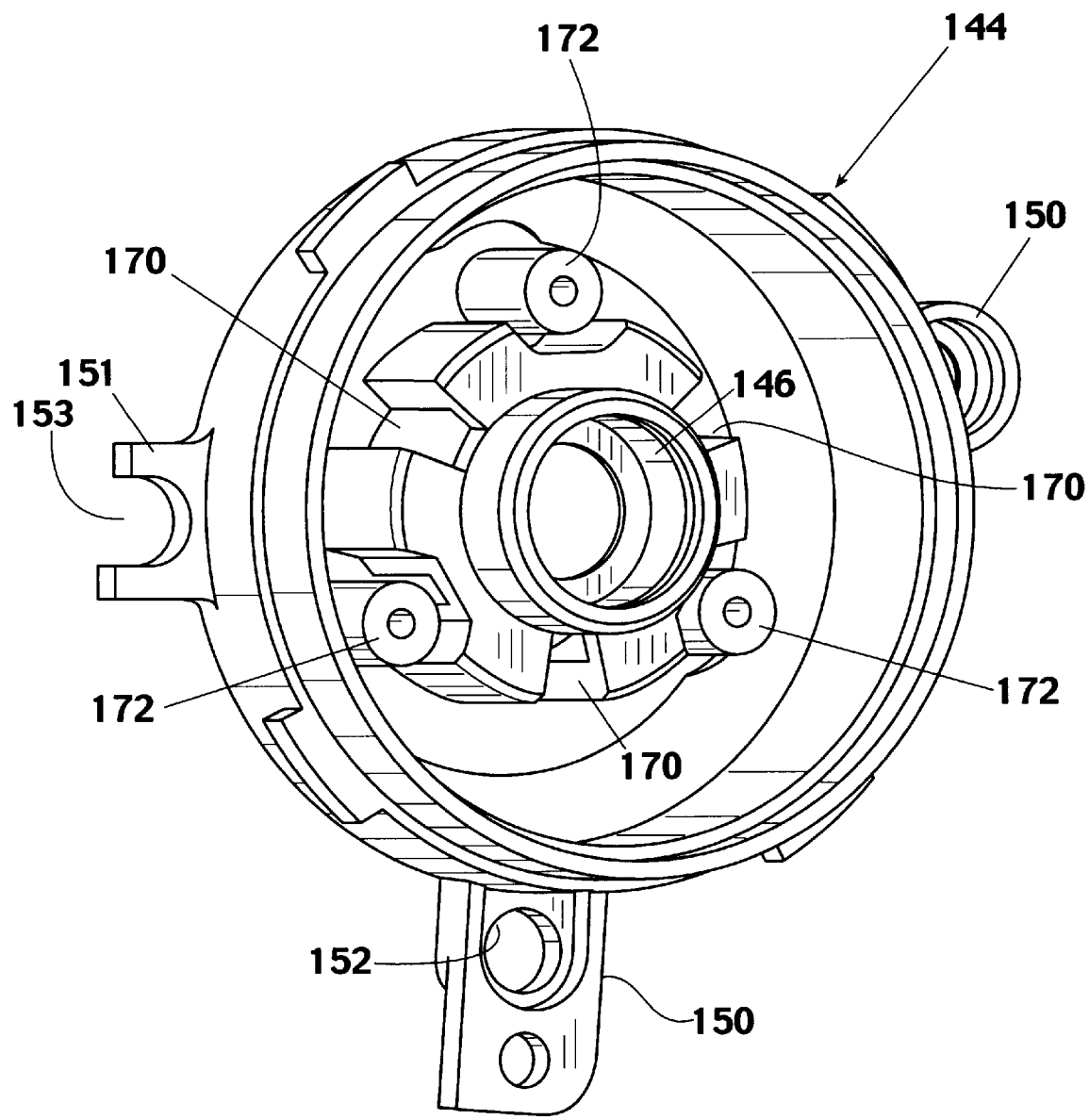
FIG. 13 provides a perspective interior view of spool cover 144.
Figure 14:
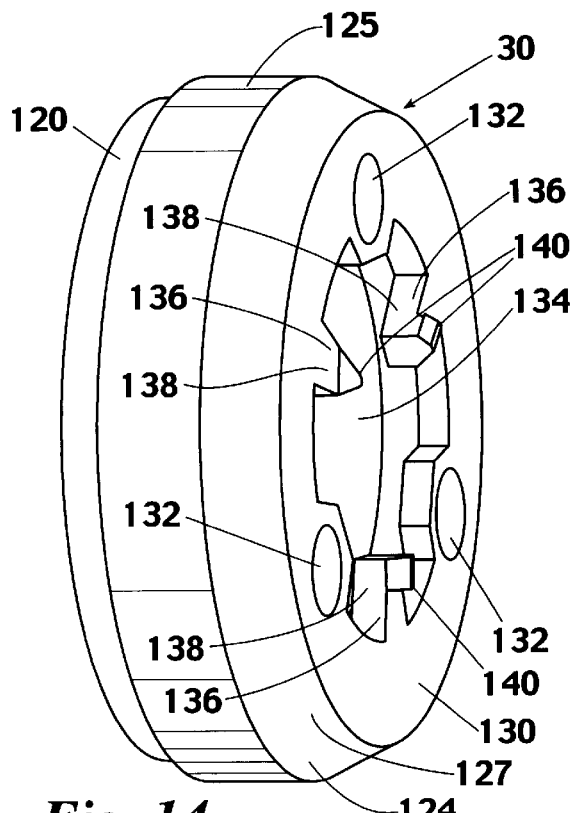
FIG. 14 provides a perspective exterior view of a brake ring assembly 30 employed in inventive braking apparatus 1.
Figure 18:
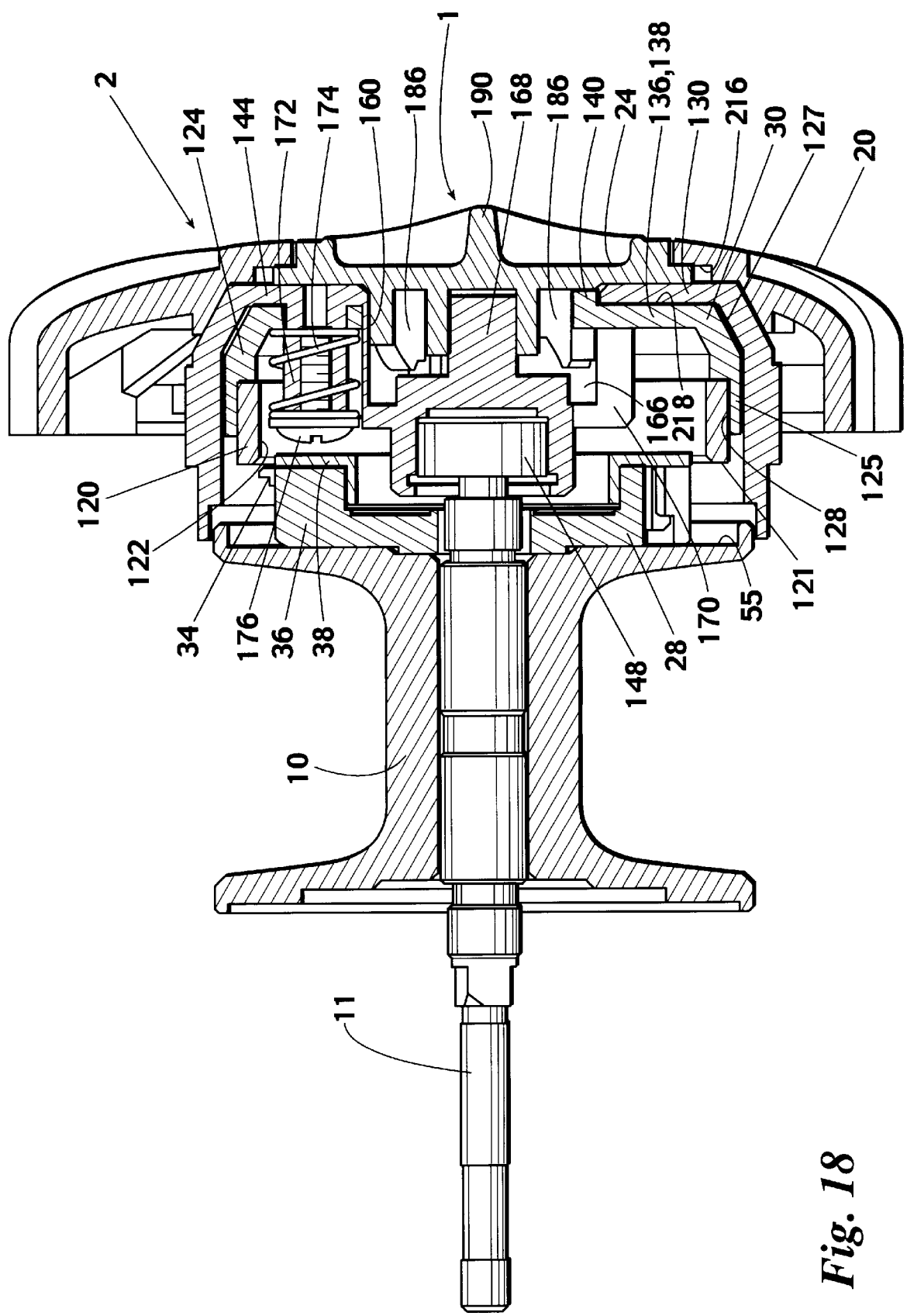
FIGS. 18 and 19 provide cutaway, elevational side views of inventive braking apparatus 1.

Depicted in FIGS. 1, 2, and 18 is a baitcasting reel 2 incorporating a preferred embodiment 1 of the inventive, adjustable, centrifugal braking apparatus. Baitcasting reel 2 comprises: a split frame 4 having a right side plate 6 and a left side plate 8; a line spool 10 rotatably mounted in frame 4 between side plates 6 and 8; a spool shaft 11 extending through spool 10; a level-wind mechanism 12 which traverses the spool during winding to ensure that the line is properly wound along the entire length of the spool; a right side cover 14 secured over side plate 6; a crank handle 16, operably extending from right cover 14, for rotating spool 10; a reel foot 18, provided on the bottom of frame 4, for attaching reel 2 to a fishing rod; and a left side cover 20 secured over left side plate 8. Inventive braking apparatus 1 is housed within left side cover 20. When reel 2 is assembled, the only externally visible feature of inventive braking apparatus 1 is a brake dial 24 projecting through a circular aperture 26 formed in left cover 20.

Although, for convenience, the inventive apparatus is herein shown and described as incorporated in a right-handed baitcasting reel, the inventive apparatus is equally adaptable for use in left-handed baitcasting reels. As will be understood by those skilled in the art, a left-handed version of generally any baitcasting reel can be produced by simply reversing the arrangement and structure of the reel's components such that the left-handed reel is a mirror image of the right-handed version of the reel.

Inventive braking apparatus 1 preferably comprises: brake dial 24; an inventive braking element assembly 28; and a brake ring assembly 30. Inventive brake element assembly 28 preferably comprises: a plurality of brake elements 34; a brake element housing 36; and a housing cover 38.

As depicted in FIGS. 9–12, each brake element 34 is preferably a T-shaped structure having: a longitudinal axis 40; a wide retaining end 42; an elongate portion 44 extending from retaining end 42; and a pair of retaining shoulders 46 defined by the transition from retaining end 42 to elongate portion 44. Elongate portion 44 has a tiered distal end 47 providing an outwardly projecting brake pad 48. Each braking element 34 preferably has both a flat forward surface 52 and a flat rearward surface 53.

As used herein, the terms "forward" and "forwardly facing" describe features facing and/or positioned away from end 55 of line spool 10. The terms "rearward" and "rearwardly facing," on the other hand, describe features facing and/or positioned toward end 55.

Brake element housing 36 is preferably a substantially cylindrical member having: a longitudinal axis of rotation 54; a forward longitudinal end 56; a rearward longitudinal end 58; a cylindrical outer wall 60; a cylindrical bore 62 extending into forward end 56; a splined passage 64 extending from bore 62 through rearward end 58; a forward radial shoulder 66 extending between cylindrical outer wall 60 and cylindrical bore 62; and a plurality of radial slots 68a, 68b, 68c, 68d, 68e, and 68f for slidably holding brake elements 34. Housing 36 also includes a plurality of (preferably 3) chamfer slots 70.

Radial slots 68a–f include: forward openings 74 provided in forward radial shoulder 66; outer openings 76 provided in outer wall 60; and substantially T-shaped segments 78. Brake elements 34 are slidably received in T-shaped segments 78 for reciprocating radial movement. Each T-shaped segment 78 comprises: a flat radial bottom surface 80; a narrow radial passage 82 extending into housing 36 from outer opening 76; a back wall 84 perpendicular to bottom surface 80; a wide inner segment 86 extending from narrow passage 82 to back wall 84; and a pair of longitudinally extending interior shoulders defined by the transition from narrow passage 82 to inner segment 86. Narrow passages 82 are sized for slidably receiving the elongate portions 44 of brake elements 34. Inner segments 86 are sized for slidably receiving the wide retaining ends 42 of brake elements 34.

Each of slots 68a–f has a depth defined by the distance from forward radial shoulder 66 to the slot's bottom surface 80. Slots 68a–f are preferably evenly spaced around housing 36 and are preferably configured such that (a) slot 68a is diametrically opposed to, and of equal depth with, slot 68b, (b) slot 68c is diametrically opposed to, and of equal depth with, slot 68d, (c) slot 68e is diametrically opposed to, and of equal depth with, slot 68f, (d) the depth of slots 68c and 68d exceeds the depth of slots 68a and 68b, and (e) the depth of slots 68e and 68f exceeds the depth of slots 68c and 68d. As explained hereinbelow, the differing depths of slots 68a–f desirably allow a wide range of specific brake settings.

Each of slots 68c, 68d, 68e, and 68f also includes a forward cavity 92 extending from forward radial shoulder 66 to T-shaped segment 78. Brake elements 34 can be placed in, and removed from, T-shaped segments 78 by delivering brake elements 34 through cavities 92. The depth of the cavities 92 provided in slots 68e and 68f exceeds the depth of the cavities 92 provided in slots 68c and 68d.

Housing cover 38 comprises: a cylindrical ring 94; a flat, radial cap 96 extending outwardly from the forward end of ring 94; a plurality of (preferably 3) resilient chamfers 98 positioned outside of ring 94 and extending rearwardly from cap 96; a first pair of identical, diametrically opposed bosses 102 positioned outside of ring 94 and extending rearwardly from cap 96; and a second pair of identical, diametrically opposed bosses 104 positioned outside of ring 94 and extending rearwardly from cap 96. Bosses 102 preferably have a size and shape corresponding to that of the forward cavities 92 of housing slots 68c and 68d. Bosses 104 preferably have a size and shape corresponding to that of the forward cavities 92 of housing slots 68e and 68f. Thus, housing cover 38 operably retains brake elements 34 in the T-shaped segments 78 of housing slots 68a–f.

Braking element assembly 28 is secured in reel 2 such that assembly 28 rotates with spool 10. Splined passage 64 of housing 36 is received over an externally splined portion 109 of spool shaft 11. When secured in this manner, the rotational axis 54 of brake element assembly 28 is collinear with the rotational axis of spool 10.

When brake element assembly 28 rotates with spool shaft 11, the resulting centrifugal force urges elements 34 to slide radially outward in slots 68 away from axis 54. Braking elements 34 are sized such that, at least when elements 34 slide into their outermost radial positions, brake pads 48 project from housing 36 through the slot openings 76 formed in outer wall 60.

Brake ring assembly 30 comprises: a brake ring 120 having an interior cylindrical braking surface 122; and a collar 124 for holding and carrying brake ring 120. As will be understood by those skilled in the art, brake ring assembly 30 could be replaced with a unitary structure wherein, for example, a cylindrical braking surface is integrally formed in collar 124.

Collar 124 comprises: a body 126 having a substantially cylindrical rearward portion 125 and an inwardly tapered forward longitudinal end portion 127; a cylindrical bore 128, formed in the rearward portion 125, wherein brake ring 120 is press fit or otherwise retained; a flat, inwardly extending, forward end wall 130; a plurality of (preferably three) cylindrical bores 132 extending through, and evenly spaced around, end wall 130; a large central aperture 134 extending through end wall 130; and a plurality of (preferably three) interacting structures 136 provided at the forward longitudinal end of body 126.

Interacting structures 136 project radially into, and are evenly spaced about, central aperture 134. Each interacting structure 136 preferably comprises: an arm 138 which extends radially into central aperture 134 from forward end wall 130; and a rounded boss 140 projecting forwardly from the distal end portion of lateral arm 138.

As is commonly the case with baitcasting reels, reel 2 includes an interior spool cover 144 comprising: a cylindrical interior cavity 146 for holding a spool shaft bearing or bushing 148; a plurality of (preferably two) radially projecting ears 150; apertures 152 provided through radial ears 150; and a radially projecting, partial ear structure 151 having a semicircular notch 153 formed in the outer end thereof. Apertures 152 and notch 153 are sized and positioned to receive internally-threaded bosses 156, provided in the interior of side cover 20, such that spool cover 144 can be secured to side cover 20 by means of bolts or screws 154.

In the inventive apparatus, spool cover 144 is preferably modified to include: a cylindrical cavity 158 provided in the forward face of spool cover 144; a substantially cylindrical interior wall 160 provided in cylindrical cavity 158; a radial wall 162 provided at the interior end of cylindrical cavity 158; a cylindrical cap 164 projecting forwardly from the center of interior end wall 162; a circular gap 166 formed between cap 164 and cylindrical interior wall 160; a cylindrical guide post 168 projecting forwardly from the center of cylindrical cap 164; and a plurality of slots 170 provided through interior end wall 162 and extending longitudinally into the cylindrical wall 160 of cavity 158. The number of longitudinal slots 170 provided in spool cover 144 corresponds to the number of interacting structures 136 provided at the forward end of brake collar 124.

Longitudinal slots 170 are sized and spaced such that interacting structures 136 are receivable in slots 170 for reciprocating forward and rearward movement with respect to spool cover 144. As interacting structures 136 reciprocate in slots 170, the distal end portions 140 of interactive structures 136 will be positioned either in or forwardly of the circular gap 166 formed in cylindrical cavity 158.

Spool cover 144 also includes a plurality of rearwardly projecting, internally threaded bosses 172 which are sized and spaced for receipt through the forward bores 132 of brake collar 124 such that collar 124 can slide forwardly and rearwardly on bosses 172. With bosses 172 received through bores 132, springs 174 are positioned around bosses 172 and are held in place by means of bolts or screws 176. Springs 174 exert a continuous, biasing force against the forward end wall 130 of brake collar 124 and thus continuously act to urge collar 124 forwardly within spool cover 144.

Figure 16:
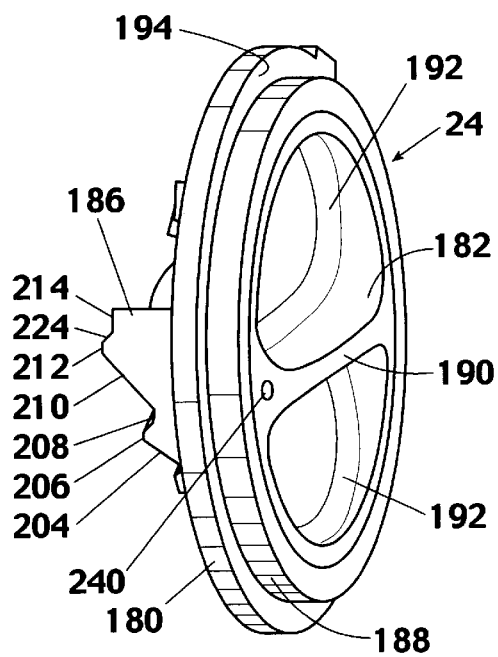
FIG. 16 provides a perspective exterior view of a braking dial 24 employed in inventive braking apparatus 1.
Figure 15:
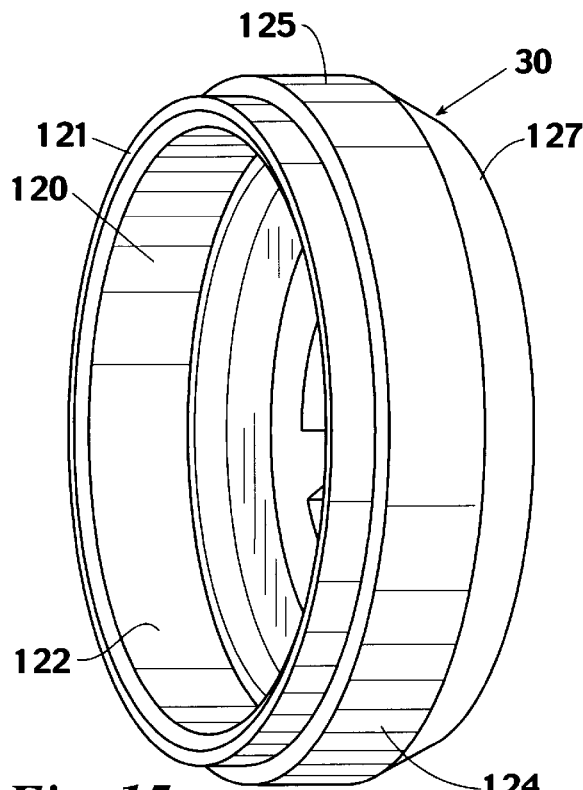
FIG. 15 provides a perspective interior view of brake ring assembly 30.
Figure 17:
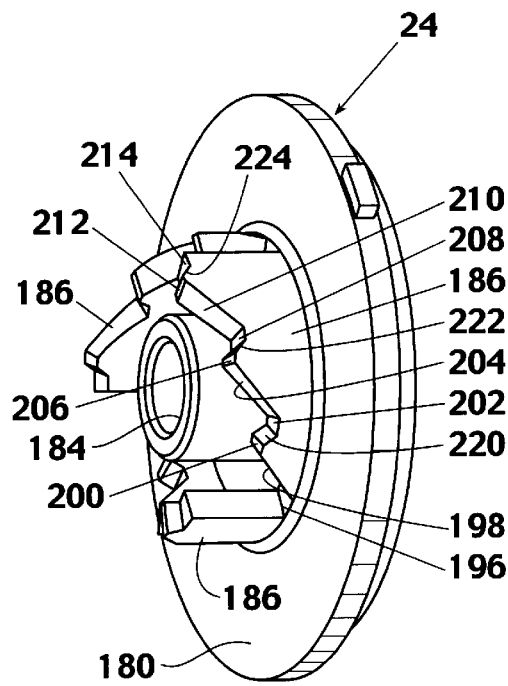
FIG. 17 provides a perspective interior view of braking dial 24.

As best seen in FIGS. 16 and 17, braking dial 24 preferably comprises: a circular dial plate 180; a grasping structure 182 provided on the forward face of dial plate 180; a cylindrical cup 184 extending from the center of the rearward face of dial plate 180 and sized for rotatably receiving cylindrical guide post 168; and three curved cams 186 projecting from the rearward face of dial plate 180. Cams 186 are arranged in a circular pattern around cylindrical cup 184. Cams 186 are receivable in the forward, cylindrical cavity 158 of spool cover 144 for rotational movement adjacent to cylindrical interior wall 160. Cams 186 interact with interacting structures 136 to thereby selectively move brake ring assembly 30 through a series of braking positions.

Grasping structure 182 projects forwardly from the forward face of dial plate 180 and includes: a cylindrical exterior wall 188; a forwardly projecting ridge 190 extending laterally across the center of grasping structure 182; and a pair of finger slots or finger cavities 192 which are formed in the forward face of grasping structure 182 and are separated by grasping ridge 190. The transition from the cylindrical exterior wall 188 of grasping structure 182 to circular dial plate 180 forms a forwardly facing, radial shoulder 194 which extends around braking dial 24.

Each of cams 186 is operable for interacting with an interacting structure 136 and includes a series of retaining features for selectively retaining interacting structures 136 in a series of forward and rearward positions. Each cam 186 preferably comprises: a flat, a groove, or other retaining feature 196 provided at the base/leading end of the cam; a first sloped segment 198 following flat 196 and having an outer peak 200; a notch, flat, or other retaining feature 202 following outer peak 200; a second sloped segment 204 having an outer peak 206, peak 206 being spaced rearwardly from first peak 200; a notch, flat, or other retaining feature 208 following outer peak 206; a third sloped segment 210 following retaining notch 208 and having an outer peak 212, peak 212 being spaced rearwardly from second peak 206; and a notch, flat, or other retaining feature 214 following third peak 212. Each of sloped ramp segments 198, 204, and 210 most preferably has a substantially constant slope.

Braking dial 24 is rotatably held between (a) an internal radial shoulder 216 formed in side cover 20 around circular aperture 216 and (b) the outer face 218 of spool cover 144. As indicated in FIG. 2A, a thin, friction reducing ring, washer, or other such element is preferably positioned between the forward radial shoulder 194 of braking dial 24 and the interior radial shoulder 216 of side cover 20. The rearward face of dial plate 180 slidably abuts the outer face 218 of spool cover 144.

When the inventive apparatus is assembled, springs 174 urge brake collar 124 forward such that the interacting structures 136 of collar 124 are maintained in operable contact with dial cams 186. When the rounded bosses 140 of interacting structures 136 are positioned on initial cam flats 196, brake ring assembly 30 is held in a fully forward position. As the user turns brake dial 24 counterclockwise, the first sloped segments 198 of cams 186 act against interacting structures 136 to push interacting structures 136 and brake ring assembly 30 rearward. When the outer peaks 200 of first sloped segments 198 move past the projecting bosses 140 of interacting structures 136, biasing springs 174 act against collar 124 to move bosses 140 into, and to retain bosses 140 in, the retaining notches 202 of cams 186. As the user continues to rotate the braking dial 24 in a counterclockwise direction, the remaining, sloped segments 204 and 210 of cam 186 push interacting structures 136 further rearward such that projecting bosses 140 will next be sequentially positioned, and retained, in cam notches 208 and then in cam notches 214.

If retaining features 202, 208, or 214 are notches, the short, trailing edges 220, 222, and 224, of cam peaks 200, 206, and 212 are also sloped such that interacting structures 136 can be moved back to any of retaining features 202, or 208, or 196 by simply rotating dial 24 clockwise.

If, in operating dial 24, the user does not squarely position projecting bosses 140 in any of retaining features 196, 202, 208, or 214, but rather leaves bosses 140 in contact with any of sloped segments 198, 204, or 210, biasing springs 174 will act to urge projecting bosses 140 forward against sloped segments 198, 204, or 210 with sufficient force to automatically turn dial 24 clockwise until projecting bosses 140 move into, and are retained by, the specific retaining feature 196, 202, or 208 provided at the base of the sloped segment. Likewise, if projecting bosses 140 happen to be left in position against any of trailing edges 220, 222, or 224, biasing springs 174 will act to automatically rotate dial 24 counterclockwise until bosses 140 move into, are retained by, the specific retaining feature 202, 208, or 214 provided at the base of the trailing edge. As will be apparent, the slope of each of range segments 193, 204, 210, 220, 222, and 224 must be sufficiently steep such that the biasing force applied to the segment will cause dial 24 to rotate.

Figure 19:
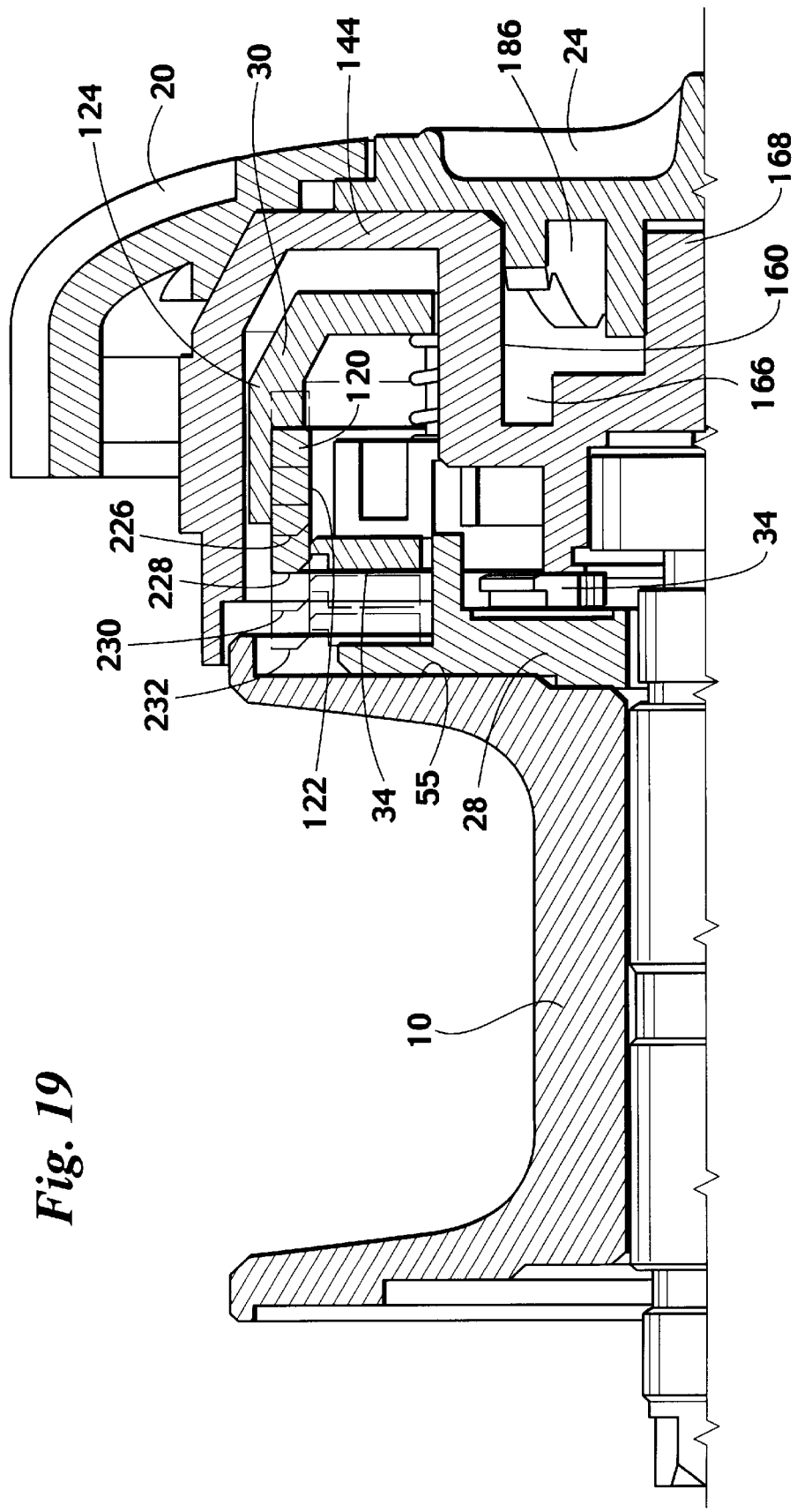

As discussed hereinabove and as best seen in FIG. 17, cam retaining features 202 are spaced rearwardly from retaining features 196, cam retaining features 208 are spaced rearwardly from retaining features 202, and cam retaining features 214 are spaced rearwardly from retaining features 208. Thus, inventive braking apparatus 1 provides four distinct braking positions. When interacting bosses 140 are retained against flats 196, brake ring 120 is held in a fully forward, non-braking position 226. When bosses 140 are retained in cam notches 202, brake ring 120 is held in an initial braking position 228 spaced rearwardly from non-braking position 226. When bosses 140 are retained in notches 208, brake ring 120 is held in an intermediate braking position 230 spaced rearwardly from initial position 228. When bosses 140 are retained in notches or flats 214, brake ring 120 is held in a full braking position 232 spaced rearwardly from position 230. Brake ring positions 226, 228, 230, and 232 are illustrated in FIG. 19.

A tab 234 provided on the outer edge of dial plate 180 operates to limit the rotation of braking dial 24 such that (a) the retaining notches 214 of cams 186 cannot be rotated past interacting structures 136 when turning braking dial 24 counterclockwise and (b) flats 196 cannot be rotated past interacting structures 136 when turning dial 24 clockwise.

The rotational movement of braking dial 24 is limited by the abutment of tab 234 with shoulders 236 and 238 provided in the interior of side cover 20. Thus, the inventive braking system cannot be turned past either full braking position 232 or nonbraking position 226. The braking position of the inventive apparatus is preferably indicated by an index mark 240 provided on the exterior of braking dial 24. Mark 240 aligns with position arrows 242 or other features provided on the exterior of side cover 20 to indicate the operating position of the inventive braking system. In the particular embodiment shown, four position arrows are provided, each corresponding to a separate one of braking positions 226, 228, 230, and 232.

The positioning of the brake elements 34 in housing 36 operates in conjunction with the axial movement of brake ring 120. The longitudinal axes 40 of the brake elements 34 contained in slots 68a and 68b lie in a first plane perpendicular to housing axis 54. The longitudinal axes 40 of the brake elements 34 contained in slots 68c and 68d lie in a second plane perpendicular to rotational axis 54. The longitudinal axes 40 of the brake elements 34 contained in slots 68e and 68f lie in a third plane perpendicular to rotational axis 54. Due to the differing depths of slots 68a–f, the second plane is spaced rearwardly from the first plane and the third plane is, in turn, spaced rearwardly from the second plane. As illustrated in FIG. 19, when brake ring 120 is placed in nonbraking position 226, none of brake elements 34 can contact braking surface 122. Initial braking position 228 of brake ring 120 constitutes a minimal brake setting wherein brake ring 120 encompasses only the brake elements 34 contained in housing slots 68a and 68b. Intermediate braking position 230 provides an intermediate setting wherein brake ring 120 encompasses the brake elements 34 contained in slots 68a, 68b, 68c, and 68d. Finally, when placed in full braking position 232, brake ring 120 encompasses, and can be contacted by, all of brake elements 34.

The inventive system ensures that brake ring 120 is always maintained in selected, consistent, predetermined braking positions. Thus, brake elements 34 will not bind against the rearward edge 121 of brake ring 120 but will always be maintained in proper position with respect to braking surface 122. Further, the user will always know what the position of the system is and will know the relative degree of braking force being applied.

As will be understood by those skilled in the art, although embodiment 1 of the inventive apparatus utilizes three cams 186 and three corresponding interacting structures 136, the inventive apparatus could optionally utilize one, two, three, or more cams 186 and corresponding structures 136. Further, although the cam-retaining features employed in embodiment 1 are shown as flats or notches, generally any type of retaining features and corresponding interacting structures could be used. Moreover, although embodiment 1 provides four specific brake settings, generally any number of brake settings could be used. The inventive apparatus will preferably provide at least two braking positions, wherein at least one braking element is allowed to contact the braking surface in only one of the two braking positions.

As will also be understood by those skilled in the art, although the inventive braking element assembly 28 is preferred, other types of braking element assemblies (e.g., radially extending rods having braking weights, pads, and/or bristles slidably mounted thereon) could be used in the inventive braking apparatus. However, regardless of the type of assembly used, it is preferred that some or all of the individual braking elements be positioned at differing longitudinal locations along the assembly's rotational axis. The positioning of the brake elements will preferably be such as to ensure that the brake ring will sequentially encompass additional elements or additional groups of elements as the brake ring is adjusted from a noncontacting position to a full contacting position.

It will be further understood by those skilled in the art that the inventive apparatus can be employed in generally any type of baitcasting reel. Further, it will be apparent to those skilled in the art that the inventive apparatus can be easily reconfigured to incorporate more or fewer braking elements 34.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel comprising:

a carrying means for carrying a braking surface;

at least one turnable cam including at least one ramp segment having an outer end and a base end;

at least one interacting member, projecting from said carrying means, for interacting with said cam;

a first retaining feature at said base end; and a second retaining feature following said outer end; wherein, said cam can be turned to selectively move said interacting member to said first and second retaining features;

when said interacting member is retained by said first retaining feature, said braking surface will be located at a first position, when said interacting member is retained by said second retaining feature, said braking surface will be located at a second position, said first position is different from said second position, and said apparatus further comprises at least one biasing member for providing a biasing force such that, when said interacting member is positioned between said base end and said outer end, said biasing force act will act to cause said interacting member to be received by said first retaining feature.

2. The braking apparatus of claim 1 further comprising:

a plurality of said turnable cams having said first and said second retaining features and a corresponding number of said interacting structures, projecting from said carrying means, for interacting with said cams, wherein said first retaining feature of each said cam corresponds to said first position and said second retaining feature of each said cam corresponds to said second position.

3. The braking apparatus of claim 2 wherein said cams project from a dial structure and said dial structure can be manually operated from outside of said reel.

4. The braking apparatus of claim 1 wherein:

said cam further includes a second ramp segment having a second segment outer end, a second segment base, and a third retaining feature following said second segment outer end;

said second retaining feature is operable for retaining said interacting member at said second segment base;

said cam can be turned to selectively move said interacting member to said third retaining feature;

when said interacting member is retained by said third retaining feature, said braking surface will be located at a third position;

said third position is different from said first and second positions; and when said interacting member is positioned between said second retaining feature and said second segment outer end, said biasing force will act to cause said interacting member to be received by said second retaining feature.

5. The braking apparatus of claim 4 wherein said second retaining feature is a notch provided in said cam.

6. The braking apparatus of claim 1 wherein said fishing reel includes a spool cover having an exterior and said braking apparatus further includes:

a cavity provided in said exterior for receiving said cam, said cavity having a cavity wall and a slot provided through said cavity wall for receiving said interacting structure such that said interacting structure projects through said slot and into said cavity for reciprocating movement within said cavity.

7. The braking apparatus of claim 6 further comprising:

a plurality of said turnable cams receivable in said cavity;

a corresponding number of said interacting structures, projecting from said carrying means, for interacting with said cams; and a plurality of said slots provided through said cavity wall for receiving said interacting structures such that said interacting structures project through said slots and into said cavity for reciprocating movement within said cavity.

8. The braking apparatus of claim 6 wherein said cavity wall is a substantially cylindrical wall and said slot extends longitudinally in said cavity wall.

9. The braking apparatus of claim 1 wherein:

said fishing reel has a rotatable line spool;

said braking apparatus includes at least one braking element which will rotate with said line spool and is operable for contacting said braking surface to generate a braking force;

said braking element cannot contact said braking surface when said braking surface is located at said first position; and said braking element can contact said braking surface when said braking surface is in said second position.

10. A braking apparatus for a fishing reel comprising:

a contacting structure;

a plurality of braking elements for contacting said contacting structure to generate a braking force;

placing means for selectively placing said contacting structure in a plurality of different, specific, predetermined positions relative to said braking elements; and means for automatically moving said contacting structure, whenever said contacting structure is positioned between any adjacent two of said different, specific, predetermined positions, to one of said adjacent two different, specific, predetermined positions.

* * * * *